Dec. 7, 1926.
J. R. DARLING
TIRE AND PROCESS OF MAKING THE SAME
Filed June 4, 1925
1,609,644
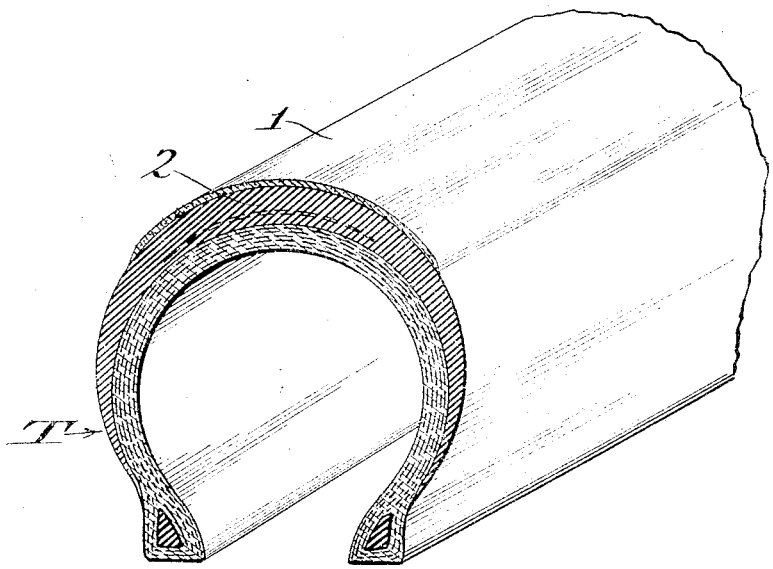
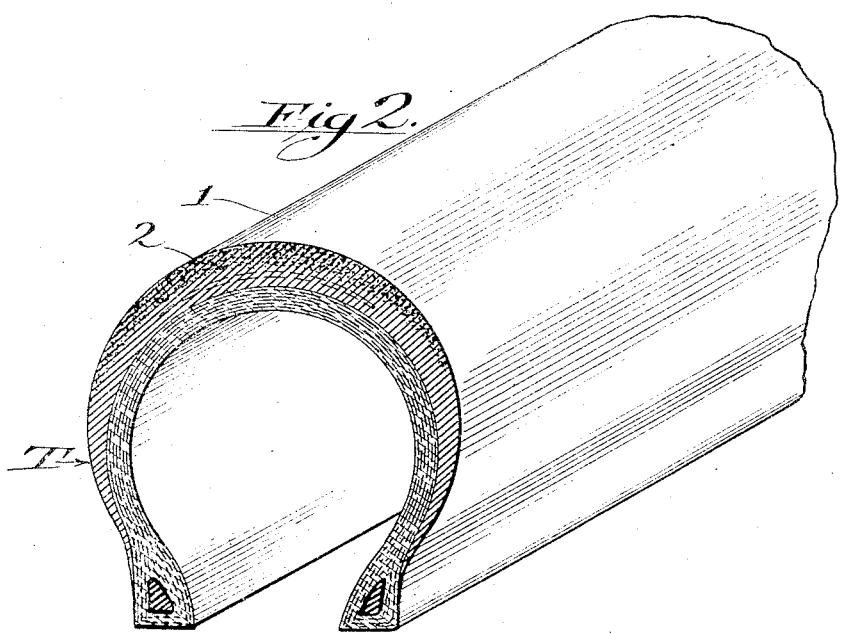
Inventor:
James R. Darling Patented Dec. 7, 1926.

1,609,644

UNITED STATES PATENT OFFICE

JAMES R. DARLING, OF WHITTIER, CALIFORNIA.

TIRE AND PROCESS OF MAKING THE SAME.

Application filed June 4, 1925. Serial No. 34,813.

My invention relates to an improvement in rubber tire casings for pneumatic tires.

It is an object of this invention to incorporate into the tread of an automobile tire casing a resinous body which will improve the wear resisting qualities of the tire casing, making the same tougher and harder, without otherwise interfering with the resiliency, of the same, and rendering the same non-skid.

My invention consists of the steps of the process and the resulting product hereinafter described and claimed.

Referring to the accompanying drawings, which form a part of the specification:

Figure 1 is a section of a pneumatic tire casing, showing a coating of material on the tread which is to be vulcanized therewith;

Fig. 2 shows a sectional view of the finished tire casing.

I take a resinous substance such as rosin, although other resinous bodies may be substituted therefor, and dissolve the same in a suitable vehicle, preferably alcohol, or other volatile solvents may be substituted therefor, and brush a coating 1 on the tread 2 of a tire T. The coating is preferably one-sixteenth of an inch thick.

The tire is then placed into any suitable or preferred vulcanizing apparatus and subjected to the ordinary vulcanizing temperature. The vulcanization will cause the coating of rosin to be absorbed and incorporated with the rubber on the tread of the tire.

I am not prepared to state at present what the physical or chemical reaction is that takes place, but the finished product appears to have absorbed the coating of resin entirely, so that none remains on the surface thereof, and the tread is considerably tougher and harder, yet being properly resilient, than the ordinary tread of the tire.

The coating with the rosin may be applied to the new tires in the manufacture, or in the retreading of old tires, with equally good results.

While it is preferable to use a volatile solvent for the rosin, the latter may be used in connection with a vehicle such as linseed oil or other solvents, the main object being to provide a coating on the tread of the tire, which is substantially composed of rosin.

Other substances may be incorporated if desired with the rosin, but the rosin is sufficient, and will give excellent results when used alone.

The tire thus produced is superior to the ordinary tires in the tougher, harder wear resisting qualities, and especially in its non-skid properties.

It will be understood that the invention relates to incorporating rosin in the tread portion of the tire, and while the drawings show a pneumatic tire casing, the invention is not limited thereto, but may be used with solid rubber tires.

Various changes may be made in the steps of the process by those skilled in the art, without departing from the steps of the process, as claimed:

I claim:

1. A process of making pneumatic tire casings and solid rubber tires, comprising applying a coating of rosin upon the tread portion thereof and vulcanizing the tire until the rosin is thoroughly absorbed by the tread of the tire.

2. A process of making pneumatic tire casings and solid rubber tires, comprising applying a coating of resinous material upon the tread portion thereof and vulcanizing the tire until the resinous material is thoroughly absorbed by the tread of the tire.

3. A rubber tire having a tread portion in which a resinous body has been incorporated by vulcanization.

4. A rubber tire having a tread portion in which rosin has been incorporated by vulcanization.

5. A rubber tire having a tread portion in which resin has been incorporated by vulcanization.

In testimony whereof I have signed my name to this specification.

JAMES R. DARLING.